United States Patent
Loveland

(10) Patent No.: US 7,493,130 B2
(45) Date of Patent: *Feb. 17, 2009

(54) SYNCHRONIZING OVER A NUMBER OF SYNCHRONIZATION MECHANISMS USING FLEXIBLE RULES

(75) Inventor: Shawn Domenic Loveland, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

This patent is subject to a terminal disclaimer.

(21) Appl. No.: 11/340,346

(22) Filed: Jan. 26, 2006

(65) Prior Publication Data

US 2006/0235898 A1    Oct. 19, 2006

Related U.S. Application Data

(63) Continuation of application No. 10/082,918, filed on Feb. 26, 2002, now Pat. No. 7,024,214.

(51) Int. Cl.
*H04B 7/00* (2006.01)

(52) U.S. Cl. .................. 455/502; 455/501; 455/503; 455/500; 370/350; 370/503

(58) Field of Classification Search ............... 455/502, 455/501, 503, 500; 370/350, 503, 506
See application file for complete search history.

(56) References Cited

U.S. PATENT DOCUMENTS

| | | | | |
|---|---|---|---|---|
| 6,308,223 | B1* | 10/2001 | Opgenoorth | 709/248 |
| 7,024,214 | B2* | 4/2006 | Loveland | 455/502 |
| 2003/0125057 | A1* | 7/2003 | Pesola | 455/502 |

* cited by examiner

*Primary Examiner*—Vincent P. Harper
*Assistant Examiner*—Khai M Nguyen

(57) ABSTRACT

Two computer systems in a network each have a local store that contains a copy of a data item that is to be synchronized. One of the computer systems may be, for example, a mobile device while the other may be a synchronization server. In order to determine whether to synchronize a data item, and what synchronization mechanism to use, one of the computer systems references a flexible set of rules that may be influenced by instructions from a network administrator or a mobile device user. The flexible set of rules takes into consideration the value of the data, the cost associated with synchronization, the security of the synchronization mechanisms, the security of the mobile device, as well as the location of the mobile user in dictating whether and how to synchronize.

20 Claims, 3 Drawing Sheets

SYNCHRONIZING OVER A NUMBER OF SYNCHRONIZATION MECHANISMS USING FLEXIBLE RULES

CROSS-REFERENCE TO RELATED APPLICATIONS

This application is a continuation of U.S. patent application Ser. No. 10/082,918, filed Feb. 26, 2002, and entitled "SYNCHRONIZING OVER A NUMBER OF SYNCHRONIZATION MECHANSIMS USING FLEXIBLE RULES", and which is incorporated herein by reference.

BACKGROUND OF THE INVENTION

1. The Field of the Invention

The present invention relates to computer network operations. In particular, the present invention relates to methods, systems, and computer program products for synchronizing by flexibly using multiple synchronization mechanisms while considering the then-existing economic and/or security considerations involved with synchronization over a particular mechanism to a particular device.

2. Background and Relevant Art

Computer networks allow more individuals more ready access to more information than ever before. The Internet is a conglomerate of interconnected computer networks that spreads far and wide throughout the world. An individual need only have an Internet-enabled computer (or device) and an Internet connection to be able to access information from across the globe.

Mobile devices such as mobile telephones; Personal Digital Assistants (PDAs) and laptop computers also may have the ability to access various objects (e.g., documents) for particular remote network locations. However, accessing documents over a network may be quite time consuming and costly and thus remote access may be unacceptable in many applications. Accordingly, with the memory capabilities of mobile devices increasing, many mobile devices have caching mechanisms that allow them to locally store synchronized copies of more relevant objects that are also stored in another network location.

Synchronization ensures that the copy of a document on the mobile device is an identical replica of a remote copy of the document. After synchronization, however, changes may be made to both of the remote copy or the local copy. Accordingly, the local and remote copies may become quite different after some time. However, the copies are once again made identical during the next synchronization.

Conventional synchronization mechanisms give the user very little control over synchronization. Basically, the user just selects items to synchronize and selects a single synchronization mechanism to use. This rigid approach ignores some factors that are relevant to whether, when, and how to synchronize.

For example, some data is more valuable than others. Yet, the conventional technique does not consider the value of the data once the items for synchronization are selected. For example, a user may select to synchronize an in-box. However, the in-box contains high-value e-mails (such as an e-mail offering a highly coveted job) as well as low value e-mails (such as unwanted spam). Yet, all of the e-mails are synchronized in the exact same manner.

Also current synchronization mechanisms do not consider the costs associated with synchronization. For example, synchronization mechanisms may involve networks with a wide variety of costs and latencies. For example, synchronization over an analog dialup that uses a Global System for Mobile communication (GSM) network has a relatively low bandwidth of approximately 9.6 to 14.4 kilobits per second. A connection over a General Packet Radio Server (GPRS) network allows somewhat faster throughput speeds of up to 115 kilobits per second. However, current GPRS networks are relatively expensive. A connection over an 802.11b (also called "WiFi") wireless network can attain speeds of up to 11 megabits per second, orders of magnitude greater than GSM or GPRS. In addition, use of 802.11b networks is typically free to those who have access to the network. However, 802.11b networks are typically less available as they currently span much less of the globe than do GSM or GPRS networks.

Current synchronization techniques also typically do not consider security concerns associated with synchronization. For example, the channel used for synchronization may have various levels of inherent security that guard against eavesdropping. For example, physical network connections are very secure, 802.11b networks are somewhat secure, with GSM dialup networks being somewhat less secure, and with GPRS networks being less secure. Also, the devices to which data may be synchronized may have varying levels of security. For example, some devices give access to any locally stored document to anyone who happens to possess the device, even if that person just stole the device from the legitimate user. Other devices are more secure by requiring a password when first logging in. Others are even more secure by having the screen saver turn on after a short period of lack of use, and require a password to restore the device once the screen saver is on. Others are yet even more secure by having an encrypted file system.

Accordingly, what is desired are mechanisms that use a synchronization mechanism that is appropriate given the economic and security concerns that exist at the time of the synchronization.

BRIEF SUMMARY OF THE INVENTION

The principles of the present invention provide for systems, methods and computer program products for performing synchronization in a flexible manner. Instead of just allowing the user a choice as to what to synchronize and then having the user manually synchronize, one or more of the pair of computer systems involved with the synchronization automatically considers the then-existing circumstances to determine whether, when and how to synchronize. In one described example, the synchronization occurs between a mobile device and a synchronization server. The methods of the present invention may be performed by either synchronizing computer system (e.g., by either the mobile device or the synchronization server).

It is first determined that a data item is to be synchronized. This may be accomplished in response to a user-issued instruction, or in response to a message from the other device indicating that the data item ought to be synchronized. The determination may also have been made by consulting a flexible set of rules that are dictated by a network administrator of the synchronization server as well as by the mobile device user.

Once it has been determined that a data item is to be synchronized, the computer system identifies the available synchronization mechanisms, and then once again consults with the flexible rules to determine which of the available synchronization mechanisms to use. The computer system then synchronizes using the selected synchronization mechanism.

The flexible selection rules may be set and changed by a network administrator and by a user of the mobile device. The flexible selection rules take into consideration the value of the data, the economic cost of synchronization, the security of the synchronization mechanism, and the security of the mobile device. Accordingly, it is much less likely that the flexible rules will allow for highly sensitive data to be shared with an insecure device or over an insecure synchronization channel. Likewise, it is much less likely that a less valuable item of data will be synchronized over an expensive network.

The synchronization rules also take into consideration the location of the mobile device and user. If none of the available synchronization mechanisms are selectable based on the flexible rules, then the synchronization may be delayed, and then the synchronization mechanism may be repeatedly reevaluated until there is a selectable synchronization mechanism.

Should synchronization occur, and later a security condition for synchronization changes, then the effects of the synchronization may be reversed. For example, suppose that the flexible rules indicate that synchronization to a mobile device is proper since the mobile device has configuration settings in which a screen saver is activated after five minutes of non-use, and that a user password is required to restore the device each time the screen saver is activated. Later, suppose the user deactivates the screen saver. The synchronization server may query the mobile device to determine that the screen saver has been deactivated. Since the original conditions for synchronization are no longer met, the synchronization server may issue an instruction to erase the data item from the mobile device, or (if change tracking is enabled) then may instruct the mobile device to roll back the data item to its pre-synchronization state.

Accordingly, the principles of the present invention perform synchronization in a much more appropriate manner considering the surrounding circumstances. In addition, the effects of synchronization may be reversed if security changes so require. Furthermore, the network administrator (and the mobile user) has much more control over when synchronization occurs. This results in a more secure, cost effective, and efficient synchronization design.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
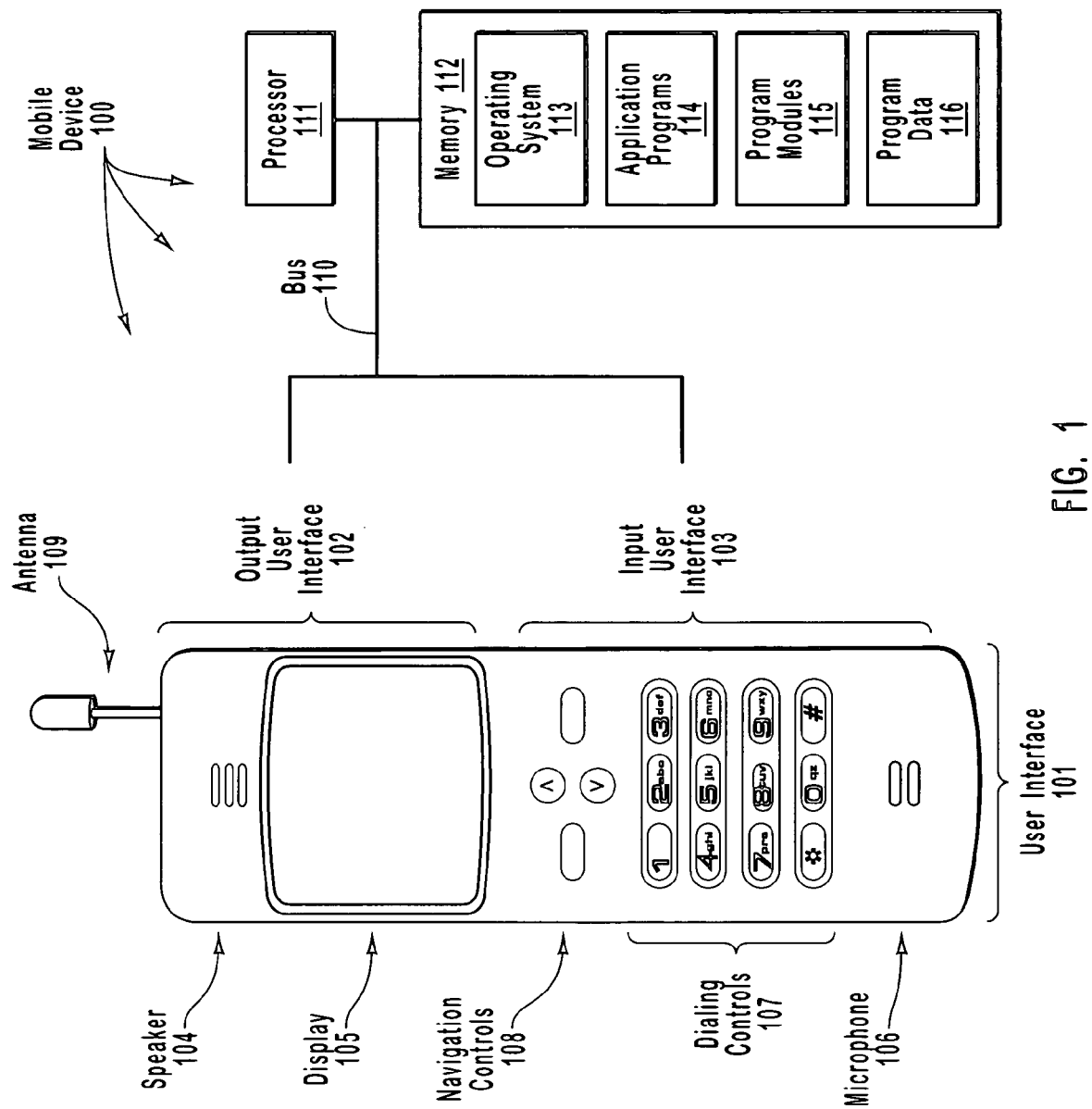
FIG. 1 illustrates an example of a telephonic device that may implement the principles of the present invention.

The present invention extends to systems, methods and computer program products for performing synchronization in a flexible manner. Two computer systems in a network each have a local store that contains a copy of a data item that is to be synchronized between the two computer systems. One of the computer systems may be, for example, a mobile device while the other may be a synchronization server. In order to determine whether to synchronize a data item, and what synchronization mechanism to use, one of the computer systems references a flexible set of rules that may be influenced by instructions from a network administrator or a mobile device user.

The flexible set of rules takes into consideration the value of the data, the cost associated with synchronization, the security of the synchronization mechanisms, the security of the mobile device, and/or the location of the mobile device and user in dictating whether and how to synchronize. If synchronization occurs, and the security conditions for synchronization are later not satisfied (e.g., the mobile device's configuration settings have been changed to make the device much less secure), the effects of the synchronization may be reversed. In essence, the principles of the present invention synchronize the appropriate data onto the appropriate device in a manner appropriate to maximize the mobile user's value, benefit, and user experience while at the same time minimize the cost and time of the transaction, and preserving synchronization security.

The embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone, Personal Digital Assistant "PDA", laptop computer, a tablet PC) where internal modules (such as a memory and processor) work together to perform operations on electronic data.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types.

With reference to FIG. 1, a suitable operating environment for the principles of the invention includes a general-purpose computer system in the form of a mobile device 100. The mobile device 100 includes a user interface 101 for allowing a user to input information through an input user interface 103, and to review information presented via an output user interface 102. For example, the output user interface 102 includes a speaker 104 for presenting audio information to the user, as well as a display 105 for presenting visual information to the user. The mobile device 100 may also have an antenna 109.

The input user interface 103 may include a microphone 106 for translating audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although user interface 101 has the appearance of a mobile telephone, the unseen features of user interface 101 may allow for complex and flexible general-purpose processing capabilities. For example, mobile device 100 also includes a processor 111 and a memory 112 that are connected to each other and to the user interface 101 via a bus 110. Memory 112 generally represents a wide variety of volatile and/or non-volatile memories and may include types of memory previously discussed. However, the particular type of memory used in mobile device 100 is not important to the present invention. Mobile device 100 may also include mass storage devices (not shown) similar to those associated with other general-purpose computer systems.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
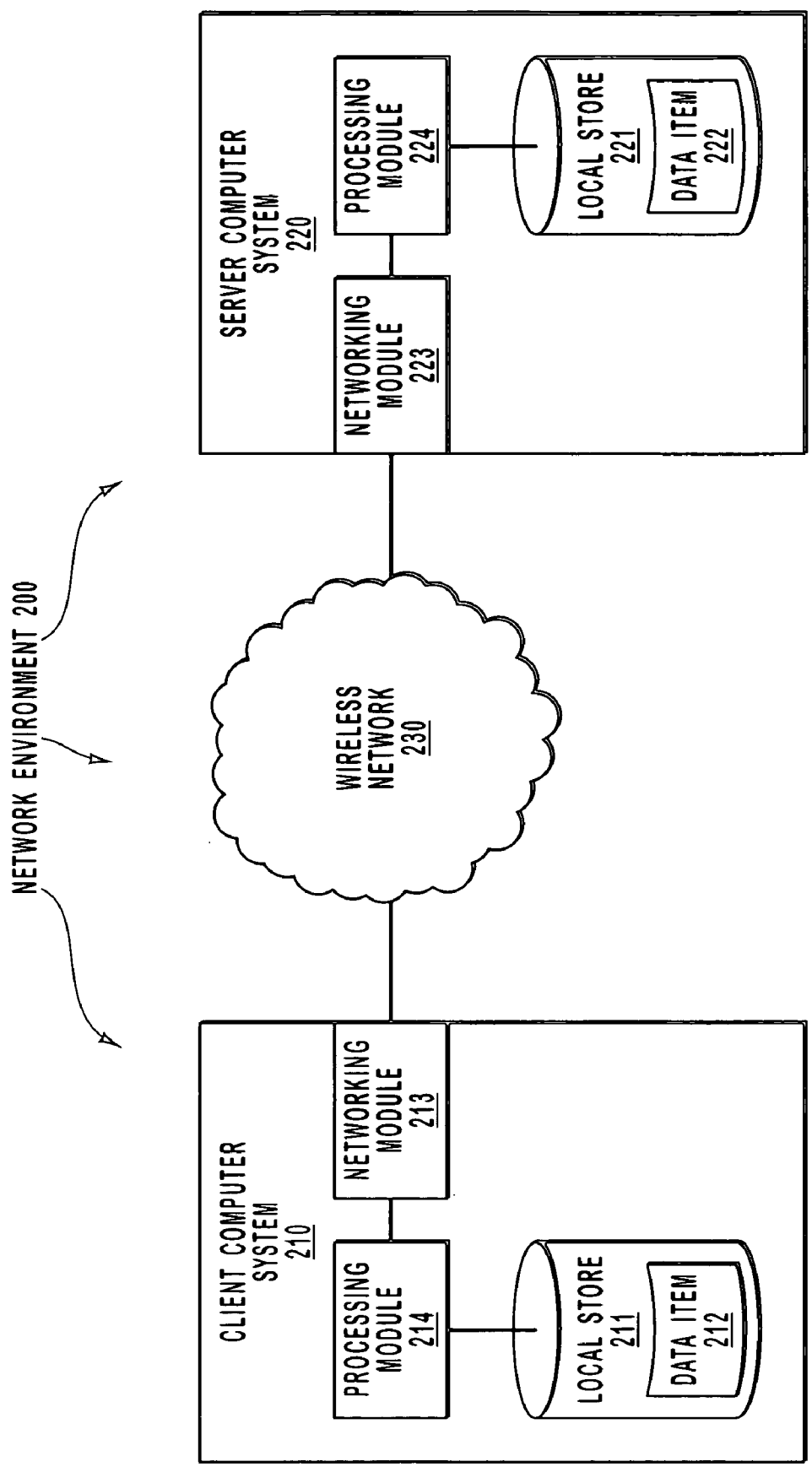
FIG. 2 illustrates an example network environment that provides a suitable operating environment for the present invention.

FIG. 2 illustrates a network environment 200 in accordance with the present invention. The network environment 200 includes a client computer system 210 (also called herein "client 210") and a server computer system 220 (also called herein "server 220") that are "network connectable" to each other over at least a wireless network 230. In this description and in the claims, "network connectable" means being "network connected" or having the ability to establish a permanent and/or temporary network connection with each other. In this description and in the claims, being "network connected" over a network means having the ability to communicate with each other over at least the network among possibly other networks as well.

The client 210 may be, for example, the mobile device 100 described with respect to FIG. 1, although the client 210 may be any general purpose and/or special purpose processing system. The client 210 has a local store 211 that may be memory 112 in the case of the mobile device 100. Local store 211 may hold a variety of different document types including image files, sound files, executable files, word processing document, spreadsheet documents, or the like. For clarity, the local store 211 is illustrated as containing a single data item 212 that is under consideration for synchronization. The data item may be any structured or unstructured data.

The client 210 also includes a networking module 213 configured to send and receive communications over the wireless network 230 to and from the server 220. Such a networking module may typically be employed within the operating system of the client 210. A processing module 214 of the client 210 is configured to coordinate access to the data item 212 from the local store, and to use of the networking module 213 so as to perform client operations in accordance with the principles of the present invention.

The server 220 may be, for example, a computer system that runs a synchronization server that synchronizes with a number of wireless devices over the wireless network 230. However, the server 220 may be any general purpose and/or special purpose processing system. The server 220 also has a local store 221 that stores a data item 222. The data item 222 at the server 220 and the data item 212 at the client 210 are versions of the same data item. At synchronization, both of these data items are identical. However, between synchronizations, changes may be made to one version, without them being immediately propagated to the other version.

The server 220 also includes a networking module 223 configured to send and receive communications over the network 230 to and from the client 210 as well as potentially other clients that are not shown for clarity. A processing module 224 of the server 220 is configured to coordinate access to the local store 221, and to use the networking module 223 so as to perform server operations in accordance with the principles of the present invention.

In one embodiment, the client 210 is a mobile device while the server 220 is a synchronization server that provides synchronization services to the mobile device. Although the principles of the present invention are not limited to this embodiment, the following will frequently refer to the embodiment in which the client 210 is a mobile device and the server 220 is a synchronization server. The synchronization server may be a service offered within a corporate network or other common sphere of trust protected by a firewall other security mechanisms from the general public. The mobile device may sometimes be within the corporate network, and may other times be far outside of the corporate network. However, there is no requirement that the synchronization server be within a corporate network. The synchronization server may be, for example, implemented as an Internet service.

Figure 3:
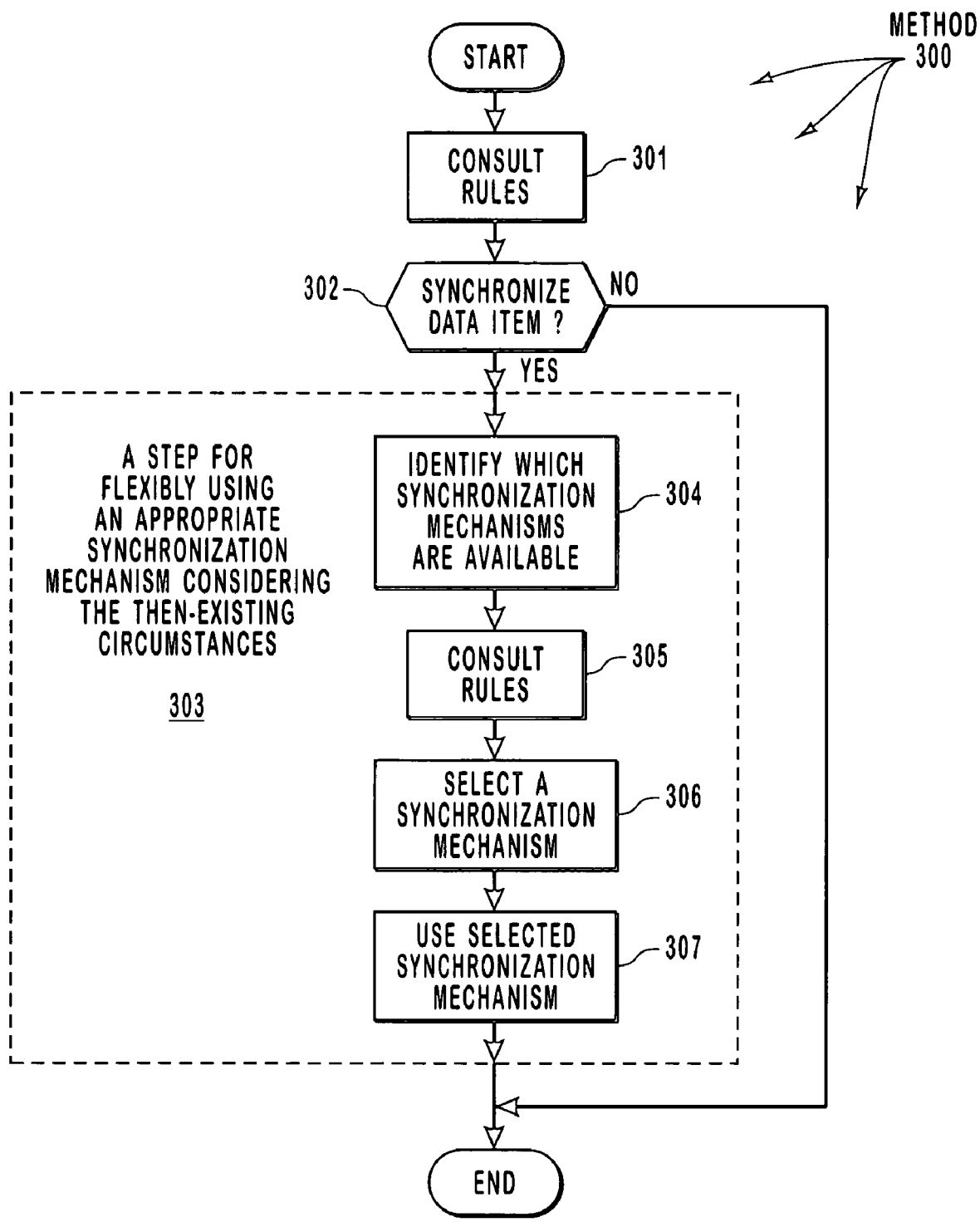
FIG. 3 illustrates a flowchart of a method for flexibly synchronizing in accordance with the present invention.

FIG. 3 illustrates a flowchart of a method 300 for performing synchronization in a flexible manner considering the then-existing circumstances. The method determines whether, how, and when to synchronize a particular data item by consulting a flexible set of rules that may be set by a user of one of the computer systems, and possible overwritten as dictated by a network administrator. It should be noted that the method 300 may be performed by either the client 210 (e.g., a mobile device) or the server 220 (e.g., a synchronization server).

The flexible set of rules balance the economic value of the data with the economic cost associated with synchronization. The rules also consider the security of the synchronization mechanism as well as the security of the computer system with which synchronization is desired. The rules balance the security risk associated with synchronization with the value in having access to synchronized data. The security rules may also consider the location of the mobile user and/or device in determining whether to synchronize.

The value of the data may be determined by user preferences and/or by a network administrator. For example, to a user, spam e-mails will typically be less important to synchronize. However, e-mails from particular senders (e.g., clients, bosses, business partners, spouses, or the like) may be of greater value to a user. E-mails that contain the words "coin" or "penny" may be of higher value to a penny collector than e-mails that do not contain such words. To a network administrator, contacts stored in a business folder may be more important than contacts stored in a personal folder. While these are just examples, the examples demonstrate that there is a wide variety of criteria from which a value of a data item may be derived based on user preferences and network administrator dictates.

Referring back to FIG. 3, the method 300 begins by consulting the set of flexible selection rules (act 301). Based on this consultation, it is determined whether or not to synchronize the data item (decision block 302). For example, the network administrator or mobile device user may have determined that data items must have at least a predetermined value in order to be synchronized. Spam, for example, might fall below that threshold. If the data item is not to be synchronized (NO in decision block 302), then the method 300 simply ends without synchronization.

If the data item is to be synchronized based on the consultation with the flexible set of rules (YES in decision block 302), then the method proceeds to a step for flexibly using an appropriate synchronization mechanism considering the then-existing circumstances (step 303). This may include any corresponding acts for accomplishing this functional result-oriented step. However, in the illustrated embodiment, the step 303 includes corresponding acts 304, 305, 306 and 307.

Note that in the illustrated embodiment, whether to synchronize is determined by consultation with a set of rules. This determination may also be made by receiving an instruction from the synchronization server, or by receiving a user-issued instruction from the mobile device user. There is no requirement that the flexible set of rules be consulted as to whether the data item is to be synchronized.

Once it has been determined that a data item is to be synchronized, the method identifies which synchronization mechanisms of a number of synchronization mechanisms are currently available (act 304). For example, a mobile device may be capable of synchronizing with a synchronization server using a number of synchronization mechanisms such as GSM, GPRS, Bluetooth, 802.11a, 802.11b (WiFi), or the like. However, it may be that the mobile device in not within an 802.11a or 802.11b hot spot, or within a Bluetooth network range. Accordingly, the only available synchronization mechanisms would be GSM and GPRS in this example. Note that although the determination of available synchronization mechanisms (act 304) is illustrated as occurring after the determination as to whether to synchronize the data item, the identification of the available synchronization mechanisms may occur before determining that any particular data item is to be synchronized. For example, the mobile device or the synchronization server may constantly or periodically reevaluate the available synchronization mechanisms. Whether synchronization mechanisms are available may even be a consistently updated configuration setting.

The method also consults the set of flexible selection rules (act 305) to select one of the synchronization mechanisms (act 306). For example, the flexible selection rules may not only be used to identify the value of the data, but may also be used to determine the economic costs associated synchronizing the data item over each synchronization mechanism. For example, analog dialup over a Public Switched Telephone Network (PSTN) network or GSM is a relatively slow way of synchronizing, but is currently typically less expensive than synchronization over a GPRS network. If the data item was relatively small, synchronization may be more appropriate over a GSM network since it might not take long even over a lower bandwidth connection to synchronize the data item.

Synchronization costs may also depend on the time of day, or the day of the week. Accordingly, the flexible rules may also consider the time of day, and day of the week in selecting an appropriate network. If the costs associated with a particular synchronization mechanism are to change shortly, then the synchronization may be delayed a short while so as to fall into a less expensive cost structure.

The flexible selection rules also may consider the security of the network associated with the synchronization mechanisms. Some networks are inherently more secure than others. For example, the mobile device may be within the same trusted corporate network as the synchronization server. If remotely connected, the security of the connection (e.g., Virtual Private Network "VPN", Short Message Service "SMS", Secure Sockets Layer "SSL", or direct Remote Access Services "RAS") may be evaluated to determine how difficult it would be for eavesdropping or redirection of the connection.

The flexible selection rules may also consider the security of the mobile device with which synchronization may occur. The mobile device may have some rigid security attributes inherent in the device and in the associated operating system itself, as well as flexible security attributes that may be changed by a user. For example, a WINDOWS XP® enabled laptop computer is generally considered more secure than most Personal Digital Assistants (PDAs). A network administrator may thus dictate to the flexible selection rules that synchronization of confidential data items may only be made to mobile laptops and not to PDAs.

The flexible selection rules may also consider where the mobile device or user is in determining a synchronization mechanism. For example, if a user is outside of a corporate network, but heading towards an 802.11b hot spot with a secure high-speed VPN connection to the corporate network, the synchronization may be delayed until the user enters the hot spot, wherein synchronization may occur with great speed and security and with very little cost.

Also, suppose the user is working on their local computer within the corporate network. Now suppose the mobile device is, by chance, not connected to the corporate network but is with the user. The synchronization server may send a notification to the user's local computer that there is important information to synchronize. The user may then connect the device to the low cost/high speed corporate network and then synchronize.

Once an appropriate synchronization mechanism is selected (act 306), then the selected synchronization mechanism is used to synchronize the data item (act 307). Once synchronized, the synchronization server may constantly or periodically reevaluate whether any security conditions for synchronization have changed such that synchronization is no longer appropriate. For example, suppose that the flexible rules indicate that synchronization to a mobile device is proper since the mobile device has configuration settings in which a screen saver is activated after five minutes of non-use, and that a user password is required to restore the device each time the screen saver is activated. Later, suppose the user deactivates the screen saver. The synchronization server may query the mobile device to determine that the screen saver has been deactivated. Since the original security conditions for synchronization are no longer met, the synchronization server may issue an instruction to erase the data item from the mobile device, or (if change tracking is enabled) may instruct the mobile device to roll back the data item to its pre-synchronization state. Alternatively, the synchronization server may also be setup to change the devices screen saver setting back to the secure mode.

The synchronization may occur automatically based on the consultation with the set of flexible selection rules. Alternatively or in addition, the synchronization server may notify the mobile device user that there is an important item to synchronize and then prompt the user as to whether to synchronize. The user of the mobile device may also indicate that synchronization is desired, and then the synchronization server might then determine which data items are appropriate to synchronize. The user may also manually synchronize by selecting particular data items to synchronize.

Some of the advantages of the present invention may be illustrated by the following scenario involving a fictional stock broker named "Michelle". Having access to up-to-date information is very important to Michelle. The information that she is interested is located in her corporate network in various server locations. She has setup her synchronization server to gather the appropriate data from the appropriate corporate servers and to update her device every morning at 5:00 AM when the data rates are lower with important information that she needs to review before she arrives at work. To do this, she may have created a "weekday morning" sync group that contains: Inbox, Tasks, Calendar, Contacts, high priority action items from her Line-Of-Business (LOB) server, and articles from the Wall Street Journal. This allows Michelle to review important information and plan her day while she eats breakfast and rides the train to work.

When Michelle gets to work, she tethers her mobile phone to her computer and the device does a complete sync. For example, she created a "in-the-office" sync group that contains: Inbox, Tasks, Calendar, Contacts, important information about her customers from the company's LOB server, the latest research information from the company's trading system, and the updates her Wall Street Journal cache. Some of the data items in the "in-the-office" sync group are highly confidential business-related items. The office's network administrator has set a global rule that indicates that such data items should not be synchronized to a mobile phone, but may only be synchronized with laptop or desktop computers with an encrypted file system. Accordingly, although most of the data items in the "in-the-office" sync group are synchronized with Michelle's mobile phone, the highly confidential data items are not. This balances Michelle's need to access information with the office's need to secure confidential information.

Michelle undocks her phone and proceeds to do various work items during the morning. She is scheduled to meet an important customer named "Tom" for lunch. Her Personal Information Management (PIM) server, her sync server and the LOB server are offering her an integrated solution. When her meeting reminder pops up on her PC it also informs her that Tom has some account activity that morning and that she should dock her phone to get this new activity synced to her phone. Michelle docks her phone and Tom's information is updated. During the cab ride, Michelle reviews Tom's account information and activity. During lunch, Tom is impressed how knowledgeable Michelle is about his account and activity.

On her way home from work, Michelle decides she would like to go out to dinner and a movie. On her device, she selects the option to sync the group "weekend personal items" and the individual item restaurant reviews. Her device then syncs movie times, her personal calendar, e-mail, and the weekend weather and restaurant reviews. She finds a movie that she would like to see near her office, finds a review of a new restaurant near the movie. She then calls a friend and makes a date.

Accordingly, the principles of the present invention allow for an intelligence determination of whether, when and how to synchronize by consulting a flexible set of rules that are derived from input from a network administrator as well as the user. The flexible set of rules takes into consideration the value of the data, the economic cost of synchronization, and/or the security of the synchronization mechanisms and device to which synchronization is proposed. Accordingly, synchronization is made in a more intelligent manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. A mobile computing device comprising the following:
   a data store;
   a networking module; and
   a processing module configured to access the data store of the mobile device as well as communicate with the synchronization server over the network using the networking module of the mobile device, wherein the processing device of the mobile device is configured to perform the following:

determine that a data item is to be synchronized;

identify which of a plurality of synchronization mechanisms, including one or more hardwired or wireless communication connections, are available to use for synchronization;

consult a set of one or more flexible selection rules to select a synchronization mechanism, the set of one or more flexible rules taking into consideration value, from having access to synchronized data, relative to at least one of (i) an economic cost for synchronization using each available synchronization mechanism, (ii) network security for each available synchronization mechanism, (iii) security of a computer system, or (iv) value of data being synchronized, and thereby select an available synchronization mechanism appropriate for the data item given the one or more flexible selection rules; and use the selected synchronization mechanism to synchronize the data item.

2. A first computer system in a network that includes the first computer system having a first data store and second computer system having a second data store, the first computer system comprising one or more computer-readable media having computer-executable instructions for implementing a method for synchronizing the first and second data stores in a flexible manner considering the circumstances that exist at the time of synchronization, wherein the method comprises:

an act of the first computer system determining that a data item is to be synchronized;

an act of the first computer system identifying which of a plurality of synchronization mechanisms, including one or more hardwired or wireless communication connections, are available to use for synchronization;

an act of the first computer system consulting a set of one or more flexible selection rules to select a synchronization mechanism, the set of one or more flexible rules taking into consideration value, from having access to synchronized data, relative to at least one of (i) an economic cost for synchronization using each available synchronization mechanism, (ii) network security for each available synchronization mechanism, (iii) security of the second computer system, or (iv) value of data being synchronized and thereby selecting an available synchronization mechanism appropriate for the data item given the one or more flexible selection rules; and an act of the first computer system using the selected synchronization mechanism to synchronize the data item with the second computer.

3. A computer system in accordance with claim 2, wherein the first computer system is a synchronization server, and the second computer system is a mobile device.

4. A computer system in accordance with claim 2, wherein the first computer system is a mobile device, and the second computer system is a synchronization server.

5. A computer system in accordance with claim 4, wherein the act of the first computer system determining that a data item is to be synchronized comprises the following:

an act of the mobile device determining on its own that the data item is to be synchronized.

6. A computer system in accordance with claim 4, wherein the act of the first computer system determining that a data item is to be synchronized comprises the following:

an act of the mobile device receiving a user-issued instruction to synchronize the data item.

7. A computer system in accordance with claim 4, wherein the act of the first computer system determining that a data item is to be synchronized comprises the following:

an act of the mobile device receiving a signal from the synchronization server that represents to the mobile device that the data item is to be synchronized.

8. A computer system in accordance with claim 2, wherein the plurality of synchronization mechanisms comprises at least one wireless synchronization mechanism.

9. A computer system in accordance with claim 2, wherein the plurality of synchronization mechanisms comprises a Virtual Private Network (VPN).

10. A computer system in accordance with claim 2, wherein the method further comprises the following:

an act of receiving instructions to change the set of flexible selection rules; and an act of changing the set of selection rules in response to the instruction.

11. A first computer system in a network that includes the first computer system having a first data store and second computer system having a second data store, the first computer system comprising one or more computer-readable media having computer-executable instructions for implementing a method for synchronizing the first and second data stores in a flexible manner considering the circumstances that exist at the time of synchronization, wherein the method comprises the following:

an act of the first computer system determining whether to synchronize a data item by consulting a set of one or more flexible selection rules, the set of one or more flexible rules taking into consideration value, from having access to synchronized data, relative to at least one of (i) an economic cost for synchronization using each available synchronization mechanism, (ii) network security for each available synchronization mechanism, (iii) security of the second computer system, or (iv) value of data being synchronized, and thereby also determining an available synchronization mechanism appropriate for the data item given the one or more flexible selection rules; and an act of the first computer system synchronizing the data item with the second computer if the first computer system determines that the data item is to be synchronized based on the one or more flexible selection rules and each available synchronization mechanism, including one or more hardwired or wireless communication connections.

12. A computer system in accordance with claim 11, wherein the first computer system is a synchronization server, and the second computer system is a mobile device.

13. A computer system in accordance with claim 11, wherein the first computer system is a mobile device, and the second computer system is a synchronization server.

14. A computer system in accordance with claim 11, wherein the method further comprises the following:

an act of receiving instructions to change the set of flexible selection rules; and an act of changing the set of flexible selection rules in response to the instruction.

15. A computer system in accordance with claim 14, wherein the act of receiving instructions to change the set of flexible selection rules comprises the following:

an act of receiving instructions to change the set of flexible selection rules from a user of the first computer system.

16. A computer system in accordance with claim 14, wherein the act of receiving instructions to change the set of flexible selection rules comprises the following:

an act of receiving instructions to change the set of flexible selection rules from an agent of the second computer system.

17. A computer system in accordance with claim 16, wherein the act of receiving instructions to change the set of flexible selection rules from an agent of the second computer system comprises the following:
   an act of receiving instructions to change the set of flexible selection rules from a network administrator of trusted network that includes the second computer system.

18. A computer system in accordance with claim 17, wherein the method further comprises the following:
   an act of receiving instructions to change the set of flexible selection rules from a user.

19. A computer system in accordance with claim 18, wherein the act of changing the set of flexible selection rules in response to the instruction, comprises the following:
   an act of fulfilling the instructions received from the network administrator of the second computer system to the extent that there is a conflict between the instructions received from the network administrator of the second computer system and the instructions received from the user of the first computer system.

20. A computer system in accordance with claim 11, wherein the method further comprises the following:
   after using the selected synchronization mechanism to synchronize the data item, an act of determining that the conditions for synchronization are no longer met in light of the flexible selection rules; and
   an act of automatically reversing the synchronization if it has been determined that the conditions for synchronization are no longer met.

* * * * *